June 16, 1964     B. WEIL ETAL     3,137,511
STRETCHER CHAIR

Filed April 5, 1961     10 Sheets-Sheet 6

United States Patent Office 3,137,511
Patented June 16, 1964

3,137,511
STRETCHER CHAIR
Burt Weil, 4235 Rose Hill Ave., Cincinnati, Ohio, and Richard H. Ferneau, Washington Court House, and Elroy E. Bourgraf, Greenfield, Ohio; said Ferneau and said Bourgraf assignors to said Weil
Filed Apr. 5, 1961, Ser. No. 100,976
13 Claims. (Cl. 280—5.24)

This invention relates to devices for transporting human bodies, and more particularly the invention is directed to devices for emergency or hospital handling of patients as well as for morticians' handling of corpses.

Few significant inventions have been made in the art of transporting human bodies for many years. For the most part, except for improvements as to details this art has remained static and comprises three main types of devices. These are the two-man stretcher, the wheel chair and the four wheeled cart. While each of these pieces of equipment may be well suited for a particular limited function, none is able to perform adequately the several differing functions necessary for the simple operation of carrying a body from a bed in an upper story of a building down stairs, and around a landing to a ground floor. First the body must be transported along a horizontal floor. Second, the body must be transported down stairs. Third, a narrow landing must, on many occasions, be negotiated. The four wheeled cart may be quite awkward on stairs and particularly around landings. Even a stretcher is a difficult piece of equipment with which to negotiate a narrow landing. The wheel chair is well suited for pivoting about a narrow landing but it is next to impossible to negotiate stairs in a wheel chair. Thus the equipment known and used prior to the advent of the present invention is actually inadequate to perform even the most common and routine of human body transporting problems.

Having in mind the difficulties in patient transportation set forth above, it is an objective of the invention to provide a stretcher chair which is more universally adapted to meet the conditions of body transportation than devices which have been used heretofore. To attain this objective the invention provides a stretcher chair comprising a plurality of panels which are so pivoted and braced with respect to each other that they may be angulated to three major configurations, namely, stretcher, chair, and stair chair supported on inclined skids.

As a stretcher, the device may be used by two attendants for shifting a patient from bed to stretcher and thereafter for carrying the patient with the attendants supporting the stretcher at its ends. The stretcher, too, may be placed on a one-man cart of the type shown in Patent No. 2,841,-438 as will be explained below. In one embodiment of the invention the skids may be angulated with respect to the stretcher, so that the stretcher can be slid down stairs.

When the device is configurated as a chair, wheels on its rear legs permit it to be wheeled along flat surfaces and permit sharp turns to be made around corners with ease.

The third major configuration of the device is that of a chair which is tilted back and is supported on skids, the skids having forward and rearward wheels. The skids permit the chair, with patient aboard, to be slid down stairs. Wheels on the front legs engage stair landing surfaces and the like to enable the device to be turned sharply.

There are several quite different leg structures which can be employed to make the chair tilt back with respect to the skids. Several constructions will be shown in the detailed description which follows. Preferred among the constructions, however, is that in which the rear legs of the device are of telescoping construction so that they may be foreshortened, the telescoping construction providing the most stable and manageable chair.

Another objective of the invention has been to provide a stretcher chair having the configurations described above and to provide control therefor which can be operated easily from the rear of the chair with the operator maintaining full control of the device.

It has been another objective of the invention to provide a stretcher chair which may be configurated as described above and which can be operated by one man. While it is preferred to utilize two men in the operation of the device for the greater safety of the patient, the device nevertheless is adapted to be operated by one man with reasonable facility in emergency cases.

The several features and advantages of the invention will become more readily apparent from the following detailed description taken in conjunction with the accompanying drawings in which.

Figures 1, 5:
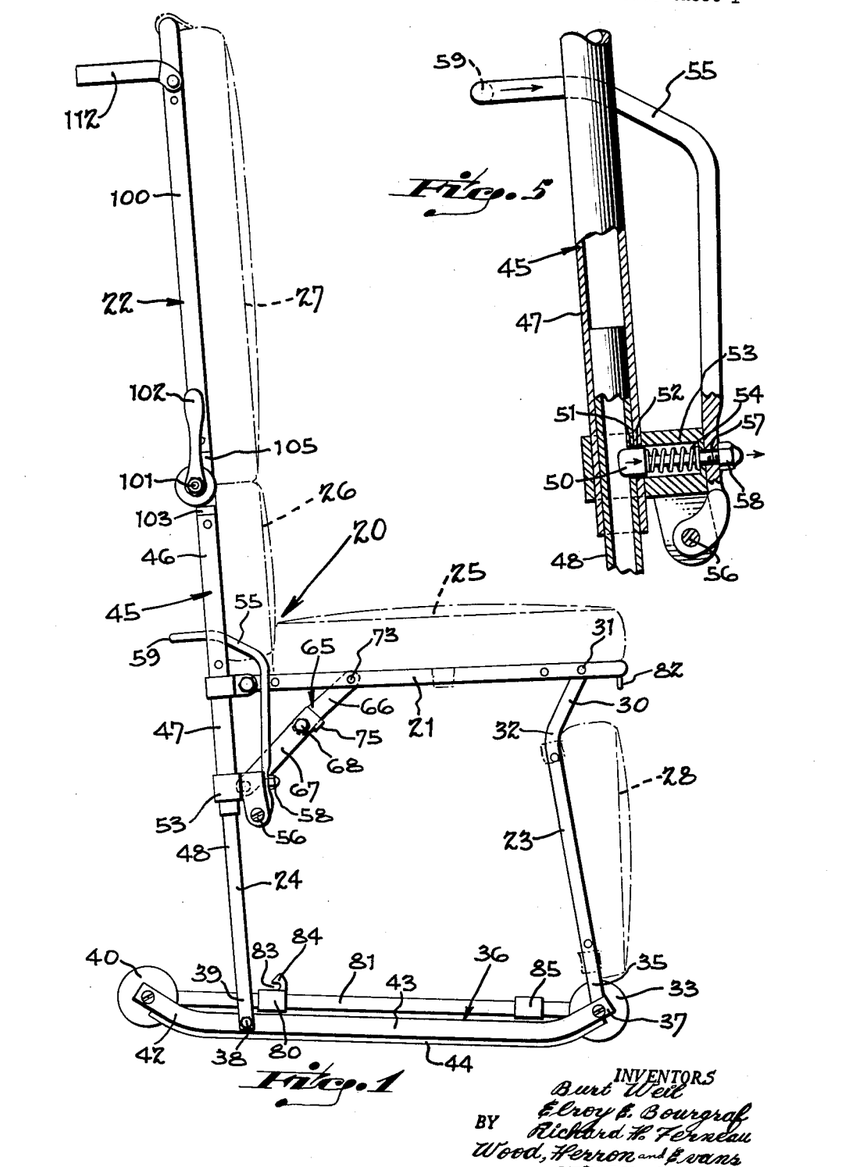
FIG. 1 is a side elevational view of the invention.
FIG. 5 is a fragmentary view partly in section showing an adjustable release for the rear legs of the chair.
Figure 2:
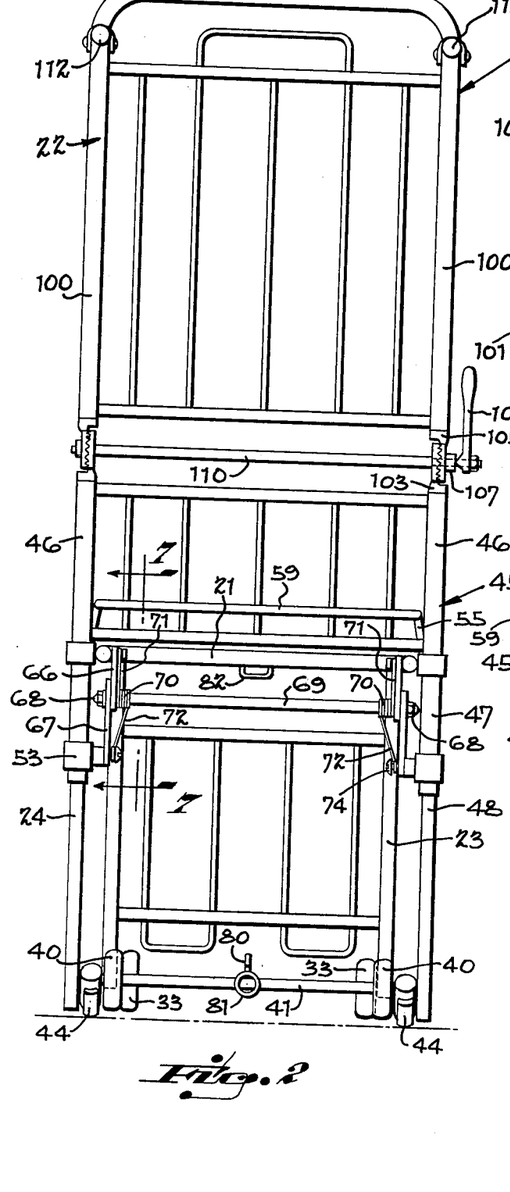
FIG. 2 is a rear elevational view thereof.

As shown in FIG. 1, a stretcher chair 20 comprises a seat panel 21 and a back panel 22 supported on front legs 23 and rear legs 24. The panels preferably are composed of a tubular metal frame and rods supported within the frame as shown in FIG. 2. A seat pad 25 is mounted on the seat panel 21 and back rest pads 26 and 27 are secured to the back panel. The front legs 23 may have a leg pad 28 secured thereto which, when the stretcher is in collapsed condition, cooperates with the pads 25, 26 and 27 to form a substantially flat stretcher.

The front legs are each pivoted at an upper end portion 30 to the seat panel 21 by means of a cross bar 31. The front legs are bent as at 32 so that when the cart is in collapsed condition, the leg pad 28 is in approximately the same plane as the seat pad 25.

A pair of wheels 33 are rotatably mounted on a rod 34 (FIG. 8) at the lower ends 35 of the front legs 23. A pair of skids 36 are pivotally connected at their forward ends 37 to the lower ends 35 of the front legs and are pivoted at 38 to the lower ends 39 of the rear legs 24.

A pair of rear wheels 40 are rotatably mounted on a rod 41 which is secured in a rearwardly projecting extension 42 of the skids 36. It should be noted that the skids 36 have an elongated central section 43 which is covered with an anti-friction material 44 and which projects below the lowest extremity of the front wheels 33 and the rear wheels 40.

A tubular section 45 at each side of the stretcher chair forms a portion of the back panel frame as at 46 and forms the upper portion 47 of the rear legs 24. The lower sections of the rear legs 24 indicated at 48 are telescopically slidable within the upper sections 47.

Figure 3:
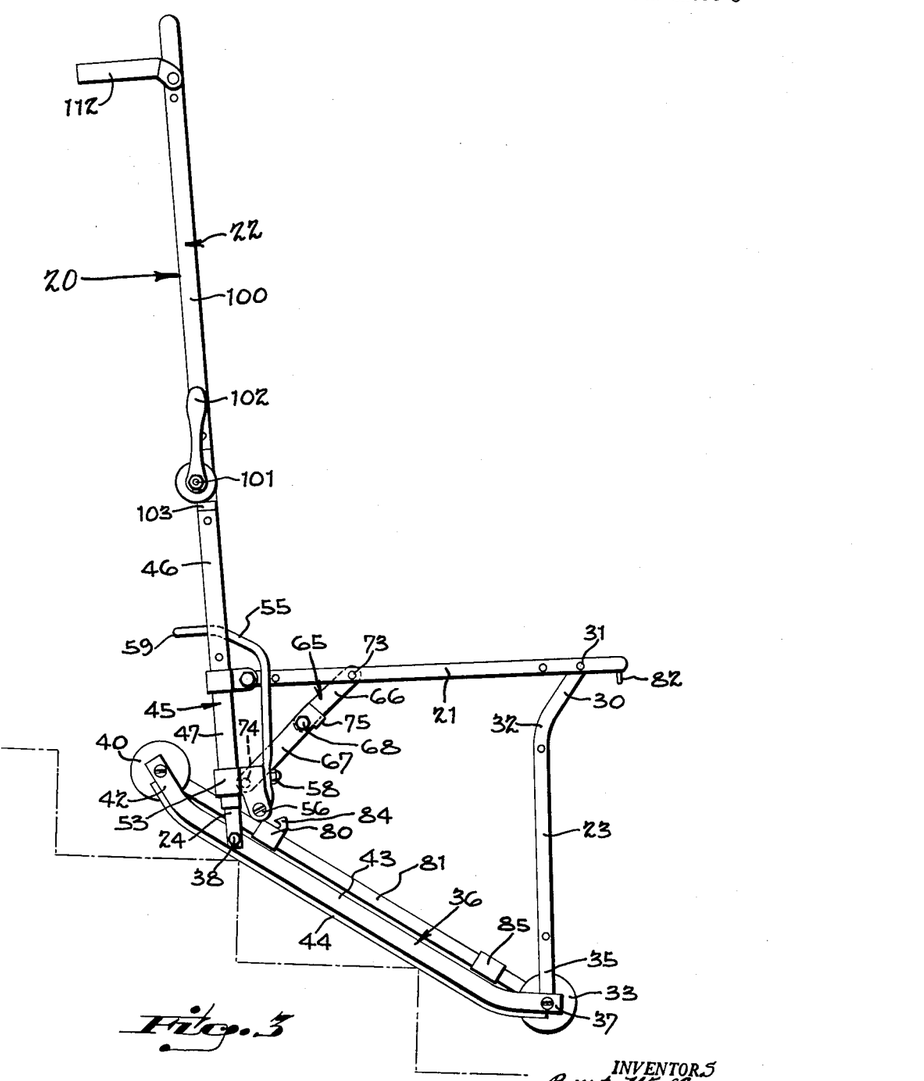
FIG. 3 is a side elevational view of the stretcher chair with the elements adjusted for stair transportation.

When the lower section telescopes within the upper section 47, the stretcher chair is configurated as shown in FIG. 3. When the legs are adjusted to their extended position, they may be fixed in such extended position by a latch mechanism associated with each leg and illustrated in FIG. 5.

Each latch mechanism comprises a pin 50 which is slidable into and out of an aperture 51 in the lower leg section 48 and an aperture 52 in upper leg section 47. The pin is disposed in a fitting 53 secured to the upper leg section 47. The fitting 53 receives a compression spring 54 which bears against the pin 50 to urge it into the apertures 51–52 in which position the upper leg section 47 is fixed in extended position with respect to the lower leg section 48.

The pins for each latch mechanism are operated by a U-shaped operator lever 55 which is pivoted at its ends 56 to fittings 53. The lever 55 has an aperture 57 at each end through which pins 50 project, the extremity of each pin having a nut 58 secured thereto. The bight portion 59 of the lever 55 extends across the back of the chair where it is easily engageable by the knee of the operator.

The stretcher chair is maintained in the erect position of FIGS. 1 and 3 by an overcenter brace 65 secured to each side of the chair, each brace having an upper member 66 and a lower member 67, the two members being pivoted together at 68 on a rod 69 best illustrated in FIG. 2. A pair of springs 70 wound about the rod 69 have upper ends 71 secured to the upper brace members 66 and lower ends 72 secured to the lower brace members 67. The upper end of each brace member 66 is pivoted at 73 to the seat panel 21 and the lower end of each lower brace member is pivoted at 74 to the fitting 53 on each rear leg. The springs 70 are wound and stressed in such a manner as to urge the braces to the erect position shown in FIGS. 1 and 3. In this position an abutment 75 on the lower brace member 67 moves into engagement with the upper brace member 66 and prevents the springs 70 from moving the brace members with respect to each other more than their slightly overcenter position.

Figure 4:
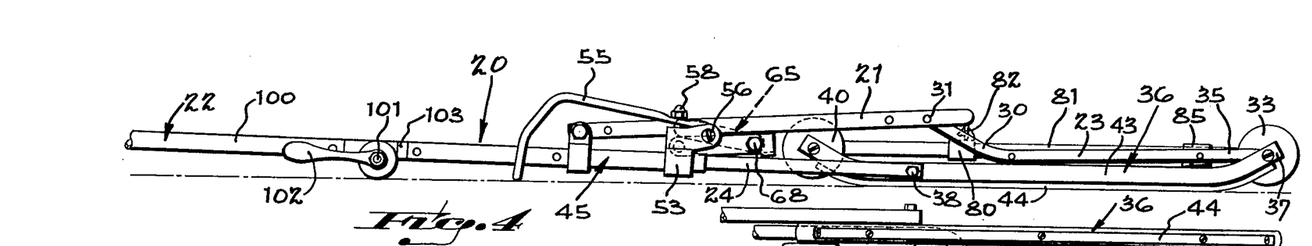
FIG. 4 is a side elevational view of the stretcher chair in collapsed condition.

The stretcher chair may be moved from the position shown in FIG. 1 to a completely collapsed position shown in FIG. 4. The shift position can be effected by the operator's pushing his foot against the cross bar 69 which forms the pivot between the upper and lower sections of the braces 65 thereby effecting the collapse of the braces. Thereafter the front and rear legs pivot about points 37 and 38 respectively to bring the back panel and seat panel to the reclined position of FIG. 4.

It may be found advisable to transport the patient with the stretcher chair in the collapsed position of FIG. 4. To this end, it is advisable to latch the stretcher chair in the collapsed position so that there will be no angular movement of the elements with respect to one another while the patient is being transported.

Figures 8, 9:
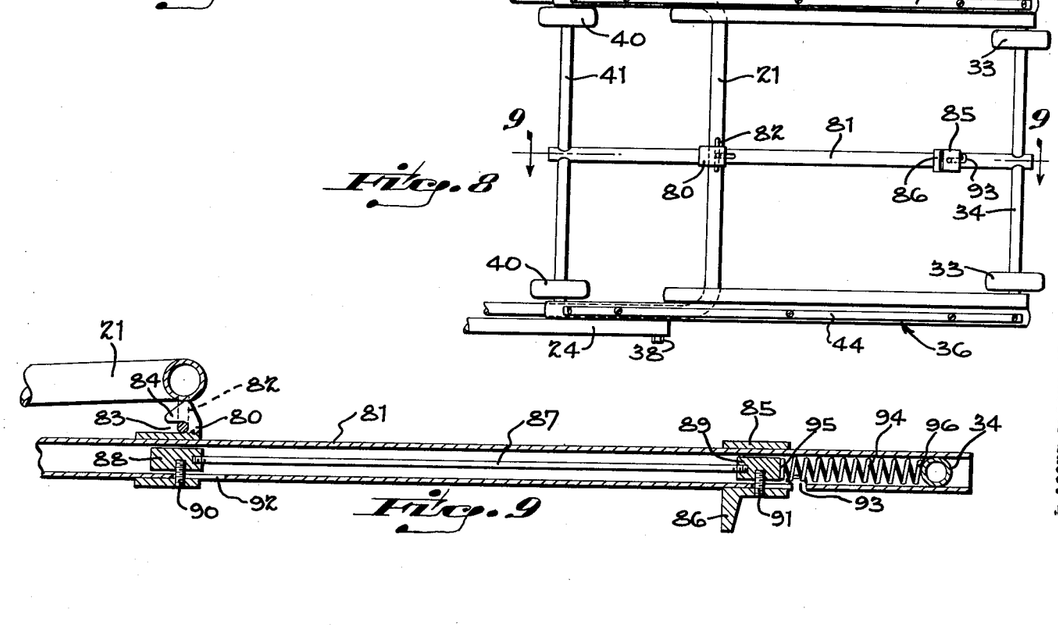
FIG. 8 is a bottom plan view of the skid portion of the stretcher chair when in collapsed condition.
FIG. 9 is a cross sectional view taken along lines 9—9 of FIG. 8.
Figure 10:
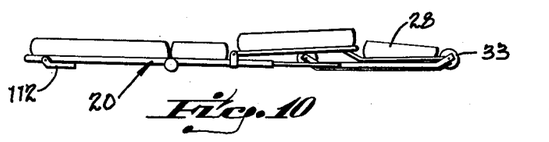
FIGS. 10 to 14 are diagrammatic views illustrating the operation of the invention.
Figure 11:
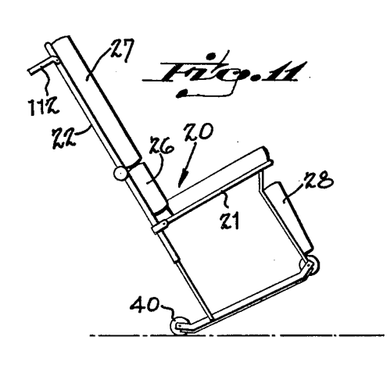
Figure 12:
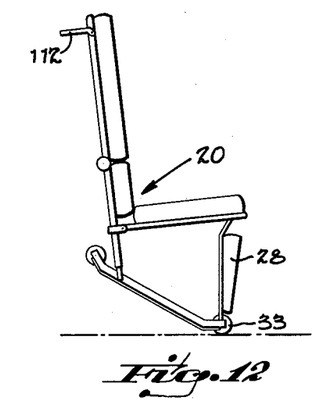

Latching is effected through the cooperation of a latch 80 which is slidably mounted on a central tubular rod 81 extending between the cross bar 34 on the front ends of the skids 36 and the cross bar 41 mounted at the rear ends of the skids. The latch 80 cooperates with a U-shaped keeper 82 which is centrally mounted on the forward end of seat panel 21. The latch 80 has a slot 83 which permits a latch portion 84, forming a latch bolt, to slide into the keeper 82. The latching cooperation is illustrated in FIG 4 and in greater detail in FIG. 9. As shown in FIG. 9, the slidable latch member 80 has a cylindrical bore by which it is mounted on the tubular member 81. Similarly, an operator 85 has a cylindrical portion which is slidably mounted on the tubular member 81 and has a projeciton 86 integral therewith. The latch member 80 is interconnected with the operator 85 by a rod 87 threaded at its ends to blocks 88 and 89. The blocks 88 and 89 are secured respectively to the latch 80 and operator 85 by screws 90 and 91 respectively. The screw 90 passes through a slot 92 and the screw 91 passes through a hook-shaped slot 93. The screw 91 can be moved toward the right as viewed in FIG. 9 and rotated slightly to hook the latch in an unlatched position. A compression spring 94 bears at one end 95 against the block 89 and at the other end 96 against the cross bar 34.

When the cot is in the collapsed condition, it may in some instances be advisable to elevate the patient's trunk so that the patient is in a sitting up position. For this purpose the back panel 22 has an upper portion 100 which is pivoted at 101 to the tubular member 46. A clamping lever 102 serves to secure the upper portion 100 in any one of several angulated positions, and is illustrated in detail in FIG. 6.

Figure 6:
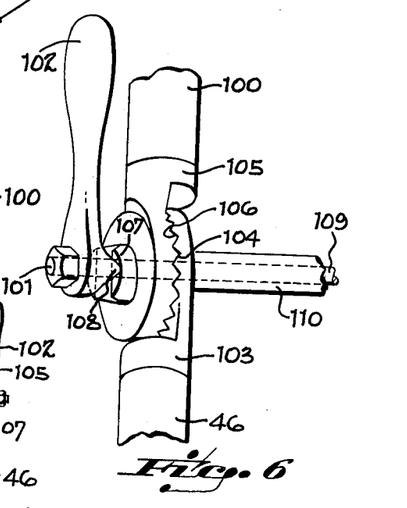
FIG. 6 is a fragmentary perspective view of the back panel adjusting mechanism.
Figure 7:
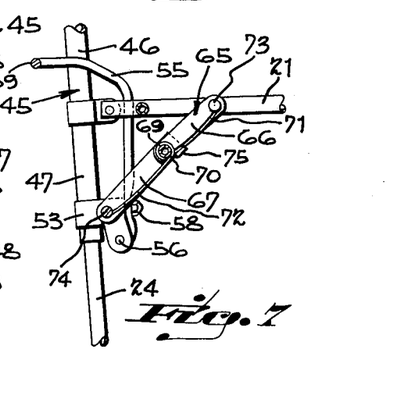
FIG. 7 is a fragmentary elevational view of the chair bracing elements, the view being taken in the direction of lines 7—7 of FIG. 2.

Referring to FIG. 6, the tubular member 46 has a fitting 103 which is serrated as at 104. Correspondingly, the upper panel section 100 has a fitting 105 which is serrated as at 106 to cooperate with the serrations 104 on the fitting 103. The fitting 105 has a U-shaped cam surface 107 which cooperates with a follower portion 108 on the lever 102. The lever 102 is held tightly against the cam surface 107 and the fittings 105 and 103 are held together by a rod 109 which passes through a tubular member 110 extending across the back of the back panel 22. When the lever 102 is in the position shown in FIG. 6, the fittings 103 and 105 are held clamped tightly together on both sides of the back panel 22. However, when the handle is moved to bring the follower 108 down into the U-shaped groove of the cam 107, the fittings are loosened with respect to each other so that they can be rotated with respect to each other to set the upper section 100 in a different angular position with respect to the tubular member 46. When the upper section 100 has been set in the proper position, the handle 102 is returned to the position of FIG. 6 so as to clamp the fittings 103 and 105 together thereby securing the back panel in the desired position.

The operation of the invention may best be understood by reference to FIGS. 10–14. For the purpose of describing the invention, let it be considered that the stretcher chair is initially in the collapesd position of FIG. 10. In this position, the stretcher chair can be laid on a bed and a patient conveniently shifted onto the stretcher chair. In this position the patient can if desired be carried from his bed into the ambulance.

Alternatively, and more usually, the stretcher chair will be adjusted to the position shown in FIG. 1 and set alongside the patient's bed. The patient will have his legs swung over the side of the bed to bring the patient to a sitting position and from this position will be gently eased into the chair shown in FIG. 1. By grasping the handles 112, the operator can tilt the chair back to the position shown in FIG. 11 and conveniently wheel it along a level floor.

When it is necessary to go down steps, the chair is moved to a position in which the forward half of skids 36 overhang the stairs and when in this position, the lever 59 at the back of the stretcher chair is pushed in so as to release the rear leg latch by withdrawing the pin 50 from the aligned apertures 51–52 in the lower and upper leg sections respectively. When the telescoping leg sections are unlatched, the chair will assume the configuration shown in FIGS. 12 and 13. Because of the overhanging position of skids 36, the skids will incline from a horizontal position upon release of the latching pin so that chair is ready to slide down the steps. In this condition, as shown in either FIGS. 3 or 13, the chair can be slid on the skids 36 down stairs. The antifriction material 44 such as Teflon, facilitates the sliding of the stretcher chair down the stairs.

When the chair is brought to a landing, the front wheels 33 first engage the landing. The chair may be conveniently moved from the stairs by rolling it on the wheels 33, the operator holding the patient in the position shown in FIG. 12 by gripping the handles 112. If the landing is quite narrow, the chair can be rotated on the wheels 33. It will be appreciated that the chair can turn a corner on a landing the dimensions of which are not substantially greater than the dimensions of the chair itself.

Figure 13:
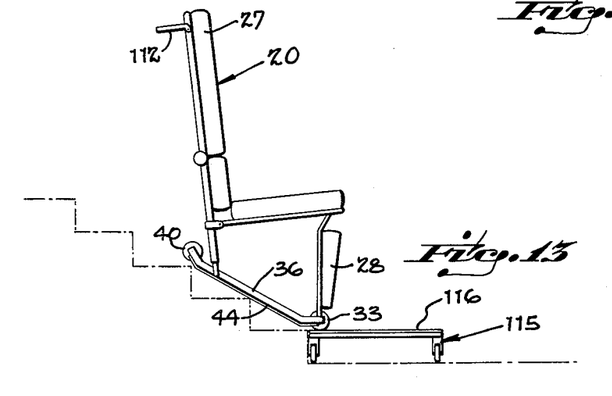
Figure 14:
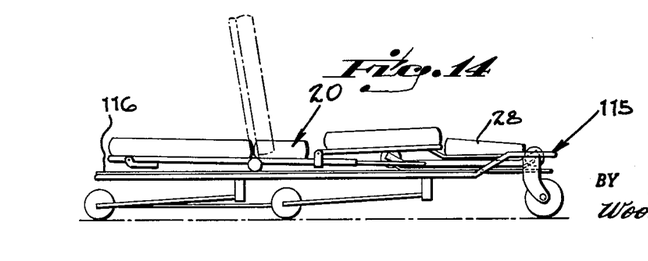

As the stretcher is brought down the last of the stairs, it may be found convenient to provide a one man cot indicated at 115 in FIGS. 13 and 14 at the bottom of the stairs. The one man cot may be of the type shown in Patent No. 2,841,438. The only modification required in the cot is to provide it with a flat surface indicated at 116. Again, the first portions of the stretcher chair to engage the flat surface 116 are the wheels 33. As the wheels 33 roll onto the surface 116, the stretcher chair can be brought to one end of the cot and thereafter the cot can be shifted to the collapsed position shown in FIG. 14. If desired, the back panel can be raised as shown in broken lines in FIG. 14 so that the patient can be transported in an upright position, this position being particularly desirable in cardiac cases for example.

When the patient, on the stretcher chair, is in the position shown in FIG. 14, one man cot 115 can quickly be brought into an ambulance employing the method and mechanism described in the patent.

It should be understood that the invention described above admits of many structural variations without departing from the scope of the invention. Some of the variations which are possible will be described below.

*First Modification*

In the modification of FIGS. 15 to 21, a major structural element of the stretcher chair is an elongated tubular U-shaped back panel 120 to which a seat panel 121 is pivotally mounted at a fitting 122. The seat panel is supported at its forward end by front legs 123 which are pivoted at 124 to the seat panel.

Figures 15, 16:
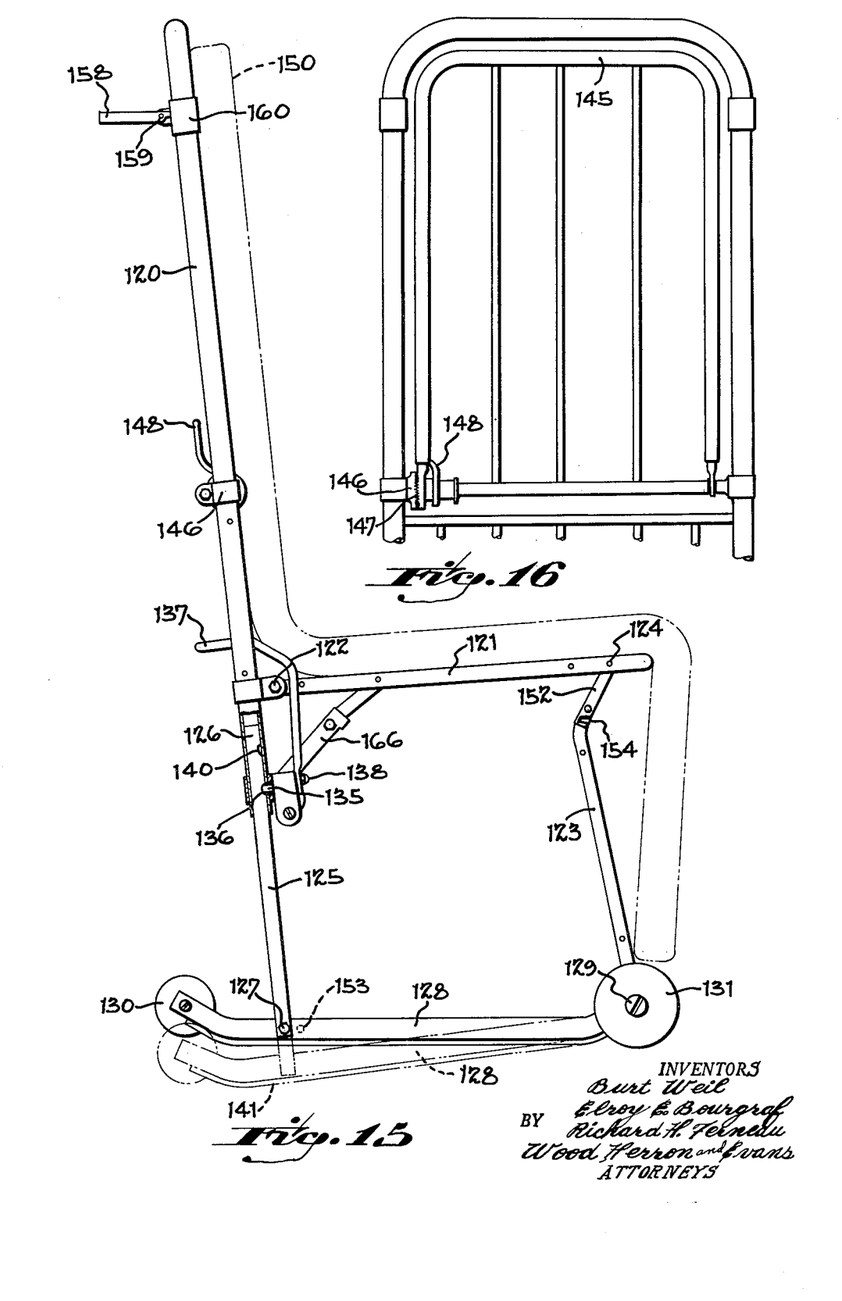
FIG. 15 is a side elevational view of an alternative embodiment.
FIG. 16 is a front elevational view of the upper portion of the device of FIG. 15.

The chair has a pair of rear legs 125 the upper ends 126 of which telescope into the U-shaped frame member 120. The lower ends of the rear legs are pivotally mounted at 127 to skids 128. The forward ends of the skids ment of cover 142 slidably thereover.

With the foregoing arrangement, a tight communication is formed between the suction line 108, holes 146, wheels 131, the forward wheels being somewhat enlarged to prevent handles, to be described below, from digging into the carpet or floor during turning of the front wheels.

As in the previous embodiment, the chair is maintained in erect position by the engagement of a pin 135 in an aperture 136 in the upper portion of rear legs 125. The pin is movable into and out of engagement with aperture 136 by the U-shaped operator lever 137 which is connected to the pins by a nut 138, all in a manner identical to that described above with reference to FIG. 5. In the present embodiment as distinguished from the first embodiment, a second aperture 140 above aperture 136 is located in the upper portion of the legs 125. The second aperture permits the legs to be extended to the broken line position indicated at 141 in FIG. 15. This is an intermediate position preparatory to the collapsing of the stretcher chair to the configuration of FIG. 22, to be described below.

As shown in FIG. 16, the central portion of the back panel is formed by a pivotal panel 145 which is pivoted at 146 to the U-shaped frame so as to provide an elevatable back rest functioning as shown in FIG. 14 in broken lines. The center panel 145 can be angulated with respect to the U-shaped frame 120 in any one of a plurality of positions by means of the serrated couplings 147 which are cammed together and released by a lever 148 in a manner similar to that described in connection with FIG. 6.

In the present embodiment instead of the series of distinct pads as employed in the earlier embodiment, a single elongated flexible pad 150 shown in broken lines in FIG. 15 is employed. This pad readily conforms to the configuration of the stretcher chair regardless of its angulated position and provides quite satisfactory comfortable support for the patient.

A latch 152 is pivoted on each side of the forward end of the stretcher chair. These latches are adapted to engage pins 153 mounted on the skids 128 and projecting inwardly therefrom. The engagement of the latches is effected when the stretcher is in the collapsed position of FIG. 20 and serves to maintain the stretcher in the collapsed position so that it can function to support the weight of a human body.

Figures 20, 21, 22:
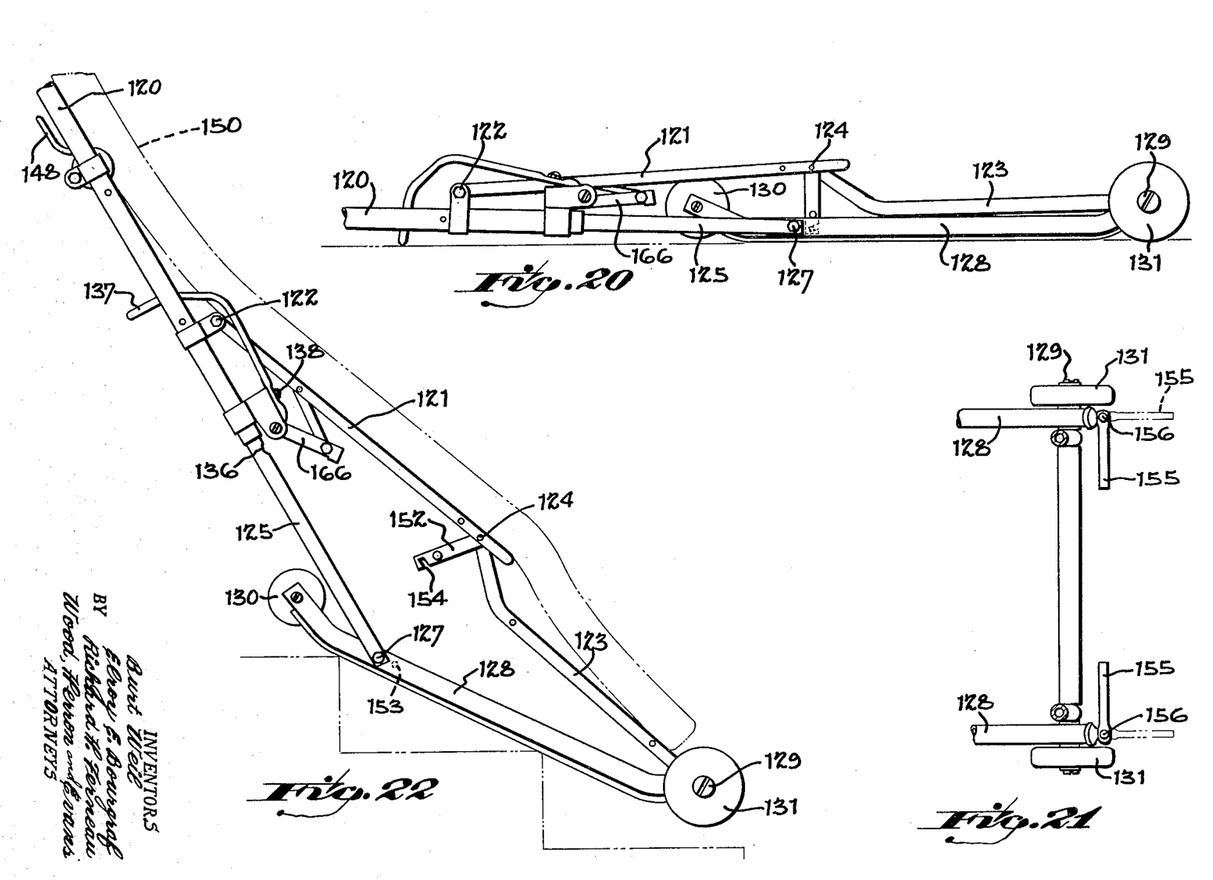
FIG. 20 is a side elevational view of the device of FIG. 15 in fully collapsed stretcher configuration.
FIG. 21 is a fragmentary view showing the front handles employed when the device of FIG. 15 is used as a stretcher.
FIG. 22 is a side elevational view of the device of FIG. 15 configurated as a stretcher adapted to slide down stairs.

A pair of carrying handles 155 are mounted at the forward ends of the skids 128 as shown in FIG. 21. The handles 155 are pivoted to the skids as at 156 so that they can be swung to a position as shown in FIG. 21 in full lines where they are out of the way or can be swung to a broken line position wherein they can be grasped by an attendant carrying one end of the device as a stretcher.

As indicated above, the wheels 131 adjoining the handles 155 are enlarged so as to prevent the jamming of the handles into the floor when the stretcher chair is pivoted on the forward wheels.

The upper end of the stretcher chair is also provided with a pair of handles 158. These handles may be pivotally mounted as at 159 to fittings 160 which are snugly although slidably mounted on the U-shaped frame 120. The handles 158 are slidable on the U-shaped frame so that they may be shifted to the most comfortable positions required by attendants of varying height. A detail of the construction is shown in FIG. 17 wherein it can be seen that the handle 158 can be pivoted from an extended position generally perpendicular to the U-shaped member 120 to an inoperative position shown in broken lines.

Figures 17, 18, 19:
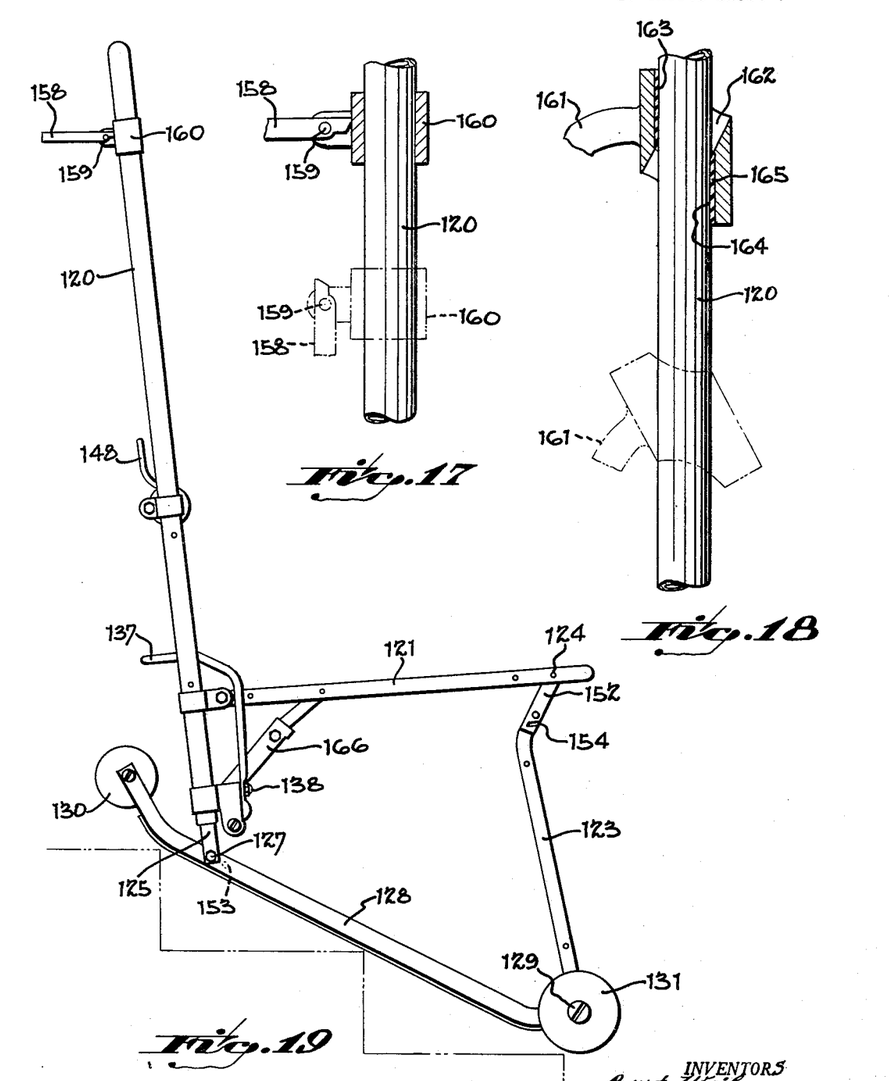
FIGS. 17 and 18 are detailed views of alternative handle constructions.
FIG. 19 is a side elevational view of the device of FIG. 15 with the rear legs foreshortened.

An alternative construction for the handles is shown in FIG. 18. In the alternative construction, a single casting is required, the casting having a handle portion 161 and a hollow portion 162 by which the handle is mounted to U-shaped frame 120. The handle has an operative position shown in full lines in which two surfaces 163 and 164 provide a binding engagement with frame member 120. The configuration of the hollow portion 162 is such that the handle can be pivoted to an inoperative position shown in broken lines and can be slid along the frame member 120. A plastic liner 165 provides sufficient friction between the handle and member 120 to prevent inadvertent sliding.

The operation of the modification of FIGS. 15 to 22 differs from the first modification in only one major respect, which is that exemplified by FIG. 22. In the configuration of FIG. 15, the device functions as a chair. When tilted back, the device can be rolled along on rear wheels 130. When the rear legs are contracted by telescoping them into the U-shaped frame member as shown in FIG. 19, the device is adapted to be slid downstairs on the skids 128, the skids having an anti-friction surface on the bottom thereof as described in the previous embodiment. Tight corners may be negotiated by pivoting the stretcher chair on the forward wheels 131.

By cracking the over-center brace 166 when the device is in the configuration of FIG. 15, the device can be fully collapsed into the stretcher position of FIG. 20. When in this position, the latch members 152 may be swung to bring their slotted portions 154 into engagement with the pins 153 on the hinge side of skids 128. Thus latched the stretcher chair assumes the configuration of FIG. 20. Handles 155 (shown in FIG. 21) can be swung out to the broken line position to provide hand grips for one of two attendants to carry the stretcher.

There are many instances when morticians, for example, must carry bodies down steps and around narrow landings. This operation is many times quite difficult particularly when a heavy body is supported on a stretcher by two men. To fill this need, for ease of handling the deceased, the stretcher chair is adapted to be configurated as shown in FIG. 22. In the position of FIG. 22, it can be seen that a substantially flat upper surface is provided upon which the body can be placed.

Additionally, the main U-shaped frame member 129 is angulated with respect to the skids 128 so that some of the weight can be supported by the skids 128 in engagement with the stairs shown in broken lines in FIG. 22. At the same time, full control of the stretcher chair is possible by the attendant standing at the rear of the stretcher chair grasping handles 158. If the angle between the U-shaped frame and the flat portion of the skids 128 is approximately 35°, the operation is found to be quite satisfactory.

The stretcher chair is brought to the configuration of FIG. 22 in two steps: First, the telescoping legs 125 must be shifted to their most extended position. This is accomplished by tilting the stretcher chair forward when it is in the configuration of FIG. 15 so as to bring the weight of the chair on wheels 131. When in this position, lever 137 is actuated to remove pin 135 from the aperture 136. When the pin 135 is thus removed, the rear legs 125 will drop from the position illustrated in full lines in FIG. 15 until aperture 140 is in line with pin 135. When in this position, the lever 137 is released to permit the pin 135 to drop in the aperture 140 so that the skids and rear legs 125 attain the position shown in the broken lines 141 of FIG. 15. Thereafter, the brace 166 is cracked and the stretcher is collapsed to the position shown in FIG. 22.

After the body has been carried down the stairs and it is necessary to convert the stretcher to the configuration of FIG. 20, the lever 137 is actuated to remove the pin 135 from the aperture 140. The weight of the stretcher and the body will force each leg 125 back into the position in which its pin 135 can engage aperture 136. This is the fully collapsed position of FIG. 20. In this position, the stretcher can be latched by means of the members 152 and the body carried by two attendants.

Figure 23:
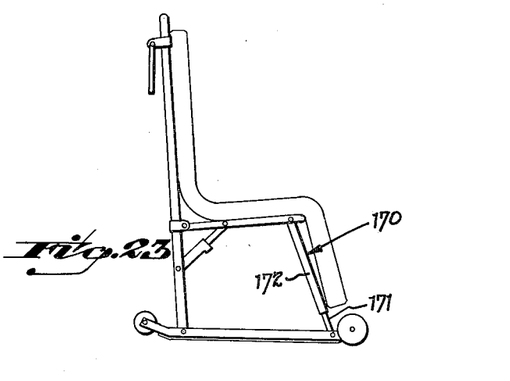
FIGS. 23–25 are diagrammatic views of a third modification.
Figure 24:
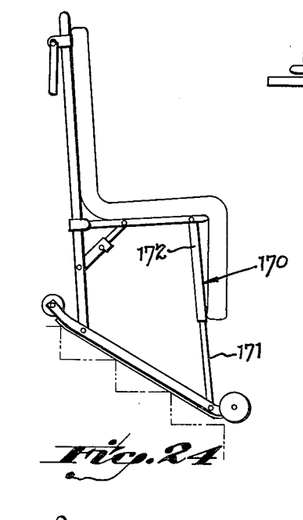
Figure 25:
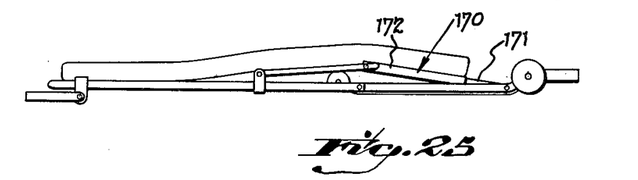

*Modification of FIGS. 23–25*

Additional structures may be employed to accomplish substantially the same results as the embodiments described above. Some of the additional modifications have been illustrated diagrammatically in the succeeding figures. In FIGS. 23–25 instead of the rear legs being telescoping, front legs 170 are provided with a lower section 171 which telescopes into an upper section 172. These leg sections 171 and 172 may be fixed in an extended position of FIG. 24 when the device is used for going downstairs or in the retracted position of FIG. 23 where the chair is used for rolling a patient along a horizontal surface. As shown in FIG. 25, the stretcher chair may be collapsed into a stretcher configuration.

Figure 26:
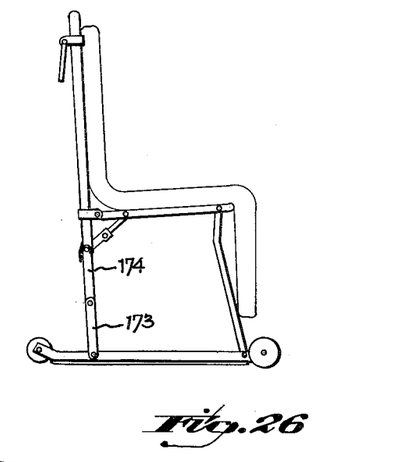
FIGS. 26–28 are diagrammatic views of a fourth modification.
Figure 27:
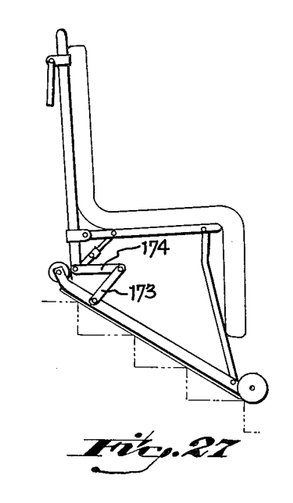
Figure 28:
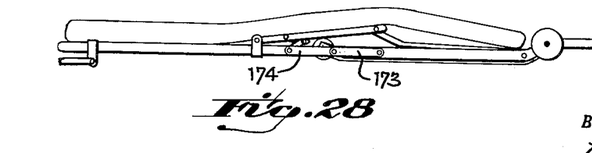

*Modification of FIGS. 26–28*

The modification of FIGS. 26–28 differs from the first modification principally in the construction of the rear legs by which they may be foreshortened or extended. In this embodiment, each leg is formed by the lower element 173 and an upper element 174 which together form an overcenter hinge. Spring means may be provided to urge the elements 173 and 174 to an overcenter locked position of FIG. 26 in which the chair is erect and in a position suitable for wheeling a patient along a horizontal surface.

Figures 29, 30, 31, 32, 33, 34:
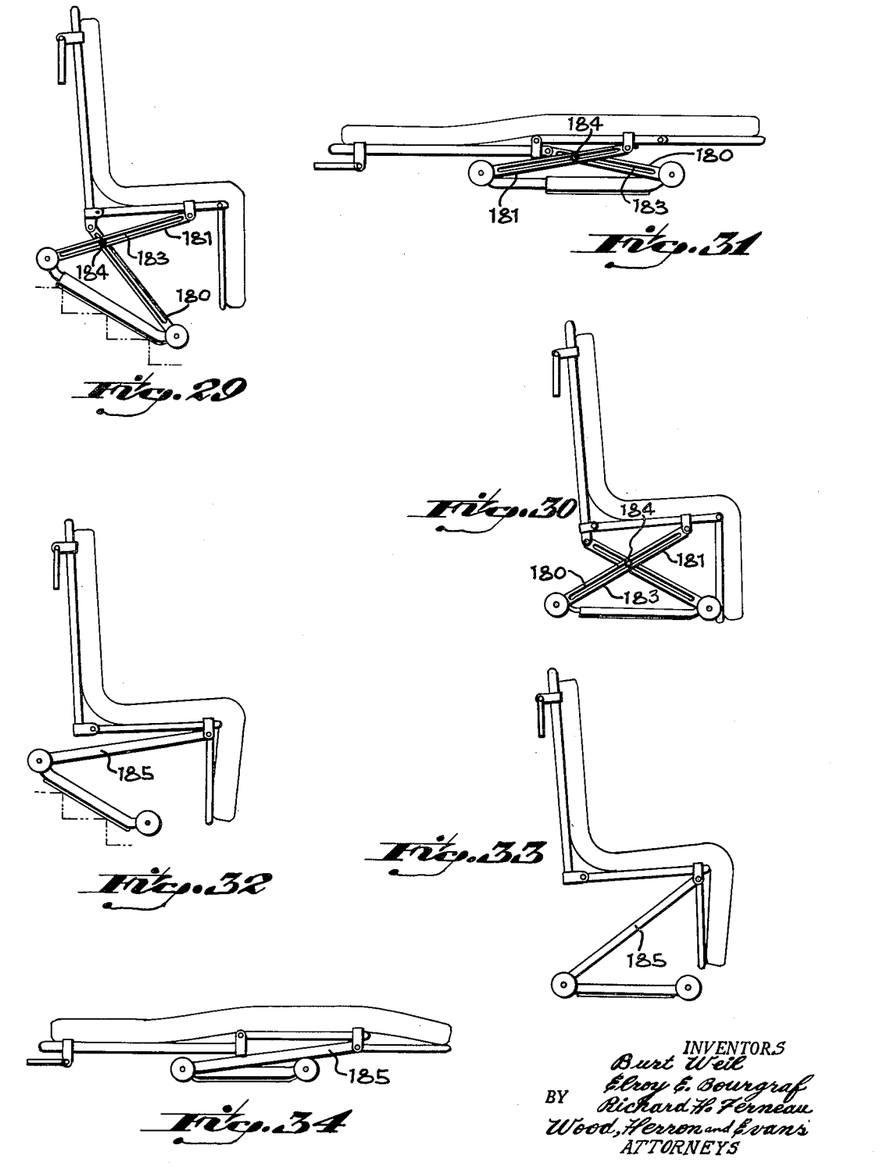
FIGS. 29–31 are diagrammatic views of a fifth modification.
FIGS. 32–34 are diagrammatic views of a sixth modification.

*Modification of FIGS. 29–31*

In the modification of FIGS. 29–31 the chair is supported on crossed legs 180 and 181. The legs are slotted as at 183 and are interconnected for sliding movement along their slot by a clamping member 184. The clamping member 184 can be as simple a mechanism as a wing nut and bolt, as long as it is satisfactory for the purpose of locking the cross legs in any one of the desired positions illustrated by FIGS. 29–31.

*Modification of FIGS. 32–34*

As shown in FIGS. 32–34, the chair can be supported on a single pair of inclined legs 185 which together with the seat panel and skids form a Z configuration. The leg preferably should be joined at its ends to the seat panel and skid respectively by a strong clamping member as for example a member of the type illustrated in FIG. 6. This member will permit the chair to be configurated as illustrated in FIGS. 32–34 while providing full support for the patient on the chair.

We claim:

1. A stretcher chair comprising, a back panel, a seat panel mounted on said back panel, front legs mounted on said seat panel and depending therefrom, wheels on the lower ends of said legs, rear legs depending from said seat, a pair of skids extending between the lower ends of said legs and having a major portion thereof below the lower extremities of said wheels, means for tilting said seat panel back with respect to said skids, said skids having extensions projecting rearwardly and upwardly from the lower ends of said rear legs, and wheels on the rearward extensions of said skids.

2. A stretcher chair comprising, a back panel, a seat panel mounted on said back panel, front legs mounted on said seat panel and depending therefrom, rear legs depending from said seat, wheels mounted adjacent the lower ends of said legs, a pair of skids extending between the lower ends of said legs and having a major portion thereof below the lower extremities of said wheels and means for tilting said seat panel back with respect to said skids.

3. An articulated stretcher chair comprising, a back panel, a seat panel pivoted to said back panel, front legs pivoted to said seat panel and depending therefrom, wheels on the lower ends of said legs, rear legs depending from said seat panel, a releasable brace connected between said rear legs and said seat panel, a pair of skids extending between the lower ends of said legs and pivoted thereto, means for tilting said seat panel back with respect to said skids, a major portion of said skids being below the lower extremities of said wheels, said skids having extensions projecting rearwardly and upwardly from the lower ends of said rear legs, and wheels on the rearward extensions of said skids, said stretcher chair being collapsible to a substantially flat position upon release of said brace.

4. An articulated stretcher chair comprising, a back panel, a seat panel pivoted to said back panel, front legs pivoted to said seat panel and depending therefrom, rear legs depending from said seat panel, a releasable brace connected between said rear legs and said seat panel, a pair of skids extending between the lower ends of said legs and pivoted thereto, and means for tilting said seat panel back with respect to said skids, said stretcher chair being collapsible to a substantially flat position upon release of said brace.

5. An articulated stretcher chair comprising, a back panel, a seat panel pivoted to said back panel, front legs pivoted to said seat panel and depending therefrom, rear legs depending from said seat panel, a releasable brace connected between said rear legs and said seat panel, a pair of skids extending between the lower ends of said legs and pivoted thereto, means for tilting said seat panel back with respect to said skids, said stretcher chair being collapsible to a substantially flat position upon release of said brace, and latch means for securing said stretcher chair in collapsed position.

6. A stretcher chair according to claim 5 in which said latch means comprises, a tubular member mounted between the lower ends of said front and rear legs, a latch slidably mounted on said tubular member, an operator slidably mounted on said tubular member and spaced from said latch, a rod located within said tubular member, screws passing through slots in said tubular member to connect said latch and operator to respective ends of said rod, the slot adjacent said operator being hook-shaped to retain said operator in an unlatched position, spring means urging said latch toward a latched position, and means on said seat panel cooperating with said latch to secure said seat panel in collapsed position.

7. A stretcher chair comprising, a back panel, a seat panel mounted on said back panel, front legs mounted on said seat panel and depending therefrom, rear legs depending from said seat, each said rear leg comprising a lower member mounted in telescoping relation to an upper member, said upper and lower members having apertures which move into alignment when said members are extended, at least one pin slidably mounted on one of said members and adapted to pass through said apertures. When said legs are in extended position, means for inserting and withdrawing said pin with respect to said apertures, and a pair of skids extending between the lower ends of said legs.

8. A stretcher chair comprising, a back panel, a seat panel mounted on said back panel, a pair of ground engaging skids normally parallel to said seat panel, support means connecting said seat panel to said skids, said support means including means for tilting said seat panel back with respect to said skids, and ground engageable wheels mounted at the forward and rearward ends of said skids, said skids having a major portion below the lower extremities of said wheels.

9. A stretcher chair according to claim 8 in which said support means comprises forward and rearward legs, said forward legs being extensible to tilt said seat back.

10. A stretcher chair according to claim 8 in which said support means comprises forward and rearward legs, each of said rearward legs comprising an overcenter toggle type brace, said brace being collapsible to tilt said seat back.

11. A stretcher chair according to claim 8 in which said support means comprises a pair of crossed, longitudinally slotted legs pivotally mounted on each side of said seat panel and skids, and releasable lock means at the intersection of said legs for permitting adjustment of the angular position of said seat panel with respect to said skids.

12. A stretcher chair according to claim 8 in which said support means comprises a pair of inclined legs extending between said skids and said seat panel, said legs being pivotally mounted to said seat panel, and releasable lock means permitting adjustment of the angular position of said seat panel with respect to said legs.

13. A stretcher chair comprising, a back panel, a seat panel mounted on said back panel, a pair of ground engaging skids, wheels at the forward and rearward ends of said skids, support means connecting said seat panel to said skids, said support means including means for tilting said seat panel back with respect to said skids, said skids having a major portion below the extremities of said wheels.

References Cited in the file of this patent

UNITED STATES PATENTS

| | | |
|---|---|---|
| 835,287 | O'Rourke | Nov. 6, 1906 |
| 846,618 | Rautenberg | Mar. 12, 1907 |
| 1,182,797 | Roosevelt | May 9, 1916 |
| 2,394,245 | Koller | Feb. 5, 1946 |
| 2,452,929 | Holcomb | Nov. 2, 1948 |
| 2,841,438 | Weil | July 1, 1958 |
| 2,958,873 | Ferneau | Nov. 8, 1960 |

FOREIGN PATENTS

| | | |
|---|---|---|
| 18,499 | Austria | Dec. 10, 1904 |
| 1,029,272 | France | Mar. 4, 1953 |
| 65,405 | Norway | Oct. 26, 1942 |
| 17,297 | Switzerland | July 29, 1898 |
| 258,710 | Switzerland | June 1, 1949 |